(12) United States Patent
Diamond

(10) Patent No.: US 12,231,729 B2
(45) Date of Patent: Feb. 18, 2025

(54) MACHINE TIME WRAP SOLUTION

(71) Applicant: Charter Communications Operating, LLC, St. Louis, MO (US)

(72) Inventor: Jamie Diamond, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/126,313

(22) Filed: Mar. 24, 2023

(65) Prior Publication Data
US 2024/0323488 A1     Sep. 26, 2024

(51) Int. Cl.
*H04N 21/4623* (2011.01)

(52) U.S. Cl.
CPC ............................. *H04N 21/4623* (2013.01)

(58) Field of Classification Search
CPC .................................................. H04N 21/4623
See application file for complete search history.

(56) References Cited

U.S. PATENT DOCUMENTS

| | | | | |
|---|---|---|---|---|
| 11,025,424 B2* | 6/2021 | Medvinsky | ............ | H04L 9/3297 |
| 2002/0051539 A1* | 5/2002 | Okimoto | ............ | H04N 21/2543 |
| | | | | 348/E7.063 |
| 2002/0076050 A1* | 6/2002 | Chen | .................. | H04N 21/2225 |
| | | | | 380/231 |
| 2002/0083438 A1* | 6/2002 | So | ...................... | H04N 21/8549 |
| | | | | 348/E7.063 |
| 2002/0087971 A1* | 7/2002 | Cochran | ............ | H04N 21/2543 |
| | | | | 348/E7.063 |
| 2005/0180568 A1* | 8/2005 | Krause | ............... | H04N 21/4181 |
| | | | | 380/212 |
| 2005/0249350 A1* | 11/2005 | Kahn | .................. | H04N 21/2541 |
| | | | | 380/239 |
| 2006/0159264 A1* | 7/2006 | Chen | ................. | H04N 21/26609 |
| | | | | 380/231 |
| 2008/0219643 A1* | 9/2008 | Le Buhan | .......... | H04N 21/4405 |
| | | | | 348/E7.056 |
| 2012/0242848 A1* | 9/2012 | Hirayama | ............... | H03M 7/24 |
| | | | | 348/208.6 |
| 2018/0006820 A1* | 1/2018 | Arasu | ...................... | G06F 16/00 |
| 2018/0020417 A1* | 1/2018 | Catovic | ................... | H04W 4/70 |

(Continued)

FOREIGN PATENT DOCUMENTS

CN          101895383 A   * 11/2010

*Primary Examiner* — James R Sheleheda
(74) *Attorney, Agent, or Firm* — THE MARBURY LAW GROUP, PLLC

(57) ABSTRACT

Systems and methods for determining time in a computing device may include a computing device receiving a conditional access time, determining whether the conditional access time is greater than or equal to a bit limitation, incrementing a counter value in response to determining that the conditional access time is greater than or equal to the bit limitation, and determining a current time value based on an epoch start date, the counter value, the bit limitation, and the conditional access time. A server device may be configured to determine whether the conditional access time is greater than or equal to the bit limitation, incrementing a counter value in response to determining that the conditional access time is greater than or equal to the bit limitation, and update the conditional access time based on a current time value, the counter value, the bit limitation, and an epoch start date.

15 Claims, 9 Drawing Sheets

(56) References Cited

U.S. PATENT DOCUMENTS

| | | | |
|---|---|---|---|
| 2018/0189464 A1* | 7/2018 | Narendra Trivedi | ............... G06F 21/126 |
| 2020/0266983 A1* | 8/2020 | Medvinsky | ........... H04L 9/0897 |

* cited by examiner

MACHINE TIME WRAP SOLUTION

BACKGROUND

User equipment (UE) devices, such as set-top boxes (STB), satellite radio receivers, and mobile phones, may include entitled hardware that is reliant on accurate time calculations and timekeeping. Entitled hardware may be a component that uses time and other factors to determine whether a user is entitled and/or eligible to receive certain features, functions, privileges, or services. For example, STBs may use embedded entitled hardware to determine whether a user is entitled to access particular channels or programs. Similarly, mobile devices may use entitled hardware to determine whether a user is eligible to make calls, access data networks and services, or access the internet. Many such devices that are currently deployed or in use may include design limitations that could lead to time-keeping errors. Such errors could prevent customers that are entitled and/or eligible for certain services from being granted access to them.

One such hardware or design limitation is that UE devices (e.g., set-top boxes, etc.) include a finite bit-size and/or a limited capacity to understand time. A device's bit-size (4-bit, 8-bit, 16-bit, 24-bit, etc.) is the number of bits that the computing device may use to represent data and/or the amount of information that the UE device may process at one time. For example, a 4-bit UE device may represent up to $2^4$ or 16 different values, while an 8-bit device may represent up to $2^8$ or 256 different values. To track time, UE devices may rely on an epoch start date, which is a point in time from which the device starts counting time. In many conventional and legacy systems, as part of a security feature, the epoch start date cannot be readily rolled over once the 4-bit, 8-bit, 16-bit, 24-bit, etc. counters have been exceeded. As a result, some devices may no longer understand time or function correctly after a certain amount of time has elapsed since their epoch start dates.

SUMMARY

Various aspects include methods of determining time in a user equipment (UE) device, which may include receiving an entitlement management message (EMM) that may include a conditional access time, determining whether the conditional access time may be greater than or equal to a bit limitation of the UE device, incrementing a counter value in response to determining that the conditional access time may be greater than or equal to the bit limitation of the UE device, and determining a current time value based on an epoch start date, the counter value, the bit limitation, and the conditional access time.

In some aspects, determining the current time value based on the epoch start date, the counter value, the bit limitation, and the conditional access time may include determining a product of the counter value and bit limitation, and setting the current time value equal to the sum of the epoch start date, the conditional access time, and the product of the counter value and bit limitation.

In some aspects, the bit limitation may be $2^{23}$ or $2^{24}$. In some aspects, the epoch start date may be January 1, Some aspects may further include using the current time in a Conditional Access Kernel or entitlement hardware on the UE device to evaluate whether to allow access to a segment or package identified in the EMM.

Various aspects may also include methods of determining a conditional access time in a server device, which may include determining whether the conditional access time may be greater than or equal to a bit limitation of a user equipment (UE) device, incrementing a counter value in response to determining that the conditional access time may be greater than or equal to the bit limitation of the UE device, and updating the conditional access time based on a current time value, the counter value, the bit limitation, and an epoch start date.

In some aspects, updating the conditional access time based on the current time, the counter value, the bit limitation, and the epoch start date may include determining a product of the counter value and bit limitation, and setting the conditional access time equal to the current time value minus the epoch start date minus the product of the counter value and bit limitation.

Some aspects may further include generating an entitlement management message (EMM) that may include the conditional access time, and sending the EMM to the UE device.

Further aspects may include a computing device having a processor configured with processor-executable instructions to perform various operations corresponding to the methods discussed above.

Further aspects may include a computing device having various means for performing functions corresponding to the method operations discussed above.

Further aspects may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1A:
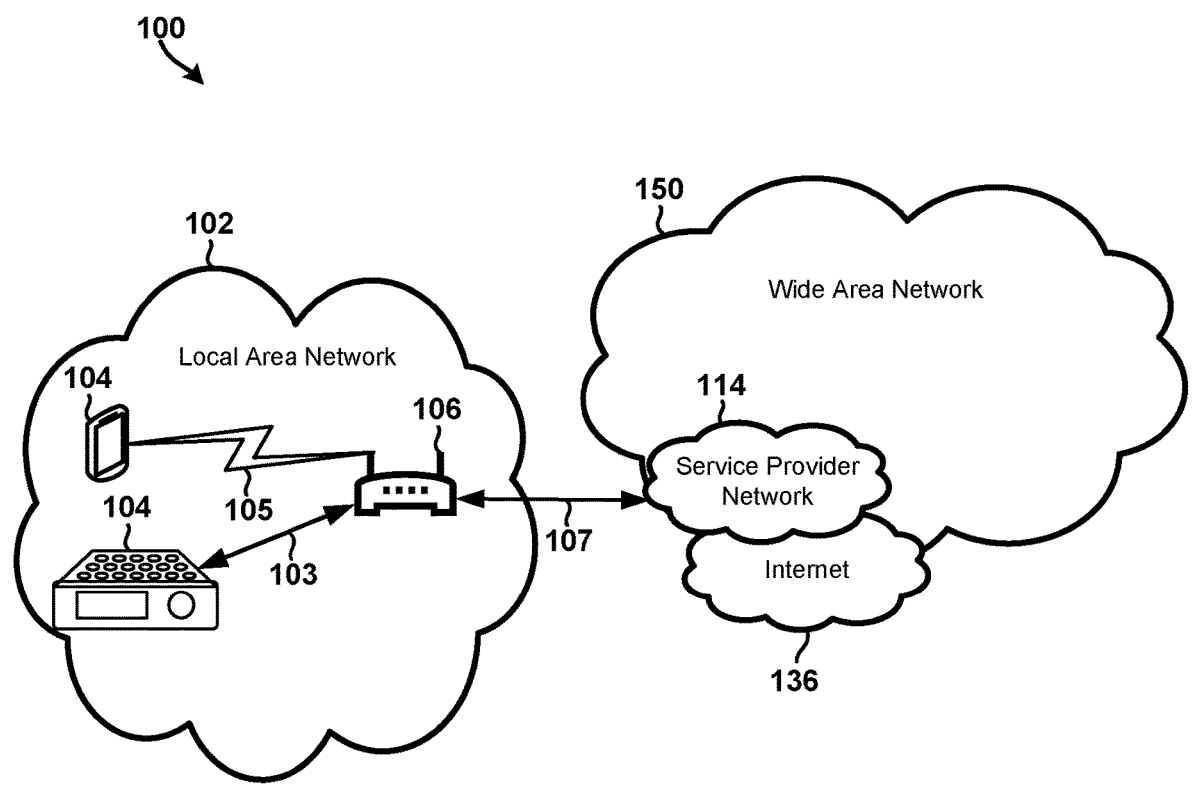
FIGS. 1A and 1B are block diagrams of example systems that include a local area network and a wide area network suitable for use with some embodiments.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

In overview, the various embodiments include methods, and computing devices configured to implement the methods, for determining time in computing devices that are subject to bit limitations.

Some embodiments may include a user equipment (UE) device (e.g., STB, etc.) that is configured to receive an entitlement management message (EMM) that includes a conditional access time, determine whether the conditional access time is greater than or equal to a bit limitation of the UE device, increment a counter value in response to determining that the conditional access time is greater than or equal to the bit limitation of the UE device, and determine a current time value based on an epoch start date, the counter value, the bit limitation, and the conditional access time. For example, the UE device may set the current time value equal to the sum of the epoch start date (e.g., Jan. 1, 1993), the conditional access time, and a product of the counter value and the bit limitation (e.g., $2^{24}$, etc.). In some embodiments, the UE device may use the current time in a Conditional Access Kernel (CAK) or entitlement hardware to evaluate whether to allow access to a segment or package identified in the EMM.

Some embodiments may include a server device (e.g., explorer controller (EC), etc.) that is configured to determine whether a conditional access time is greater than or equal to a bit limitation of a UE device, increment a counter value in response to determining that the conditional access time is greater than or equal to the bit limitation of the UE device, and update the conditional access time based on a current time value, the counter value, the bit limitation, and an epoch start date. For example, the server device may set the conditional access time equal to the current time value minus the epoch start date minus a product of the counter value and the bit limitation. The server may include the conditional access time in an EMM that is sent to the UE device.

The term "service provider network" is used generically herein to refer to any network suitable for providing consumers with access to the Internet or IP services over broadband connections, and may encompass both wired and wireless networks/technologies. Examples of wired network technologies and networks that may be included within a service provider network include cable networks, fiber optic networks, hybrid-fiber-cable networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, satellite networks that send and receive data etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), Bluetooth®, land mobile radio (LMR), and integrated digital enhanced network (iden). Each of these wired and wireless technologies involves, for example, the transmission and reception of data, signaling and/or content messages.

Any references to terminology and/or technical details related to an individual wired or wireless communications standard or technology are for illustrative purposes only, and not intended to limit the scope of the claims to a particular communication system or technology unless specifically recited in the claim language.

The terms "user device" and "user equipment (UE)" may be used generically and interchangeably herein to refer to any one or all of satellite or cable set top boxes (STBs), laptop computers, rack mounted computers, routers, cellular telephones, smart phones, personal or mobile multi-media players, personal data assistants (PDAs), customer-premises equipment (CPE), tablet computers, smart books, palm-top computers, wireless electronic mail receivers, multimedia Internet enabled cellular telephones, wireless gaming controllers, streaming media players (such as, ROKU™), smart televisions, digital video recorders (DVRs), modems, routers, network switches, residential gateways (RG), access nodes (AN), bridged residential gateway (BRG), fixed mobile convergence products, home networking adapters and Internet access gateways that enable consumers to access communications service providers' services and distribute them around their house via a local area network (LAN), and similar electronic devices which include a programmable processor and memory and circuitry for providing the functionality described herein.

The terms "component," "system," and the like may be used herein to refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer-readable media having various instructions and/or data structures stored thereon. Components may communicate by way of local and/or remote processes, function or procedure calls, electronic signals, data packets, memory read/writes, and other known computer, processor, and/or process-related communication methodologies.

The term "secure-micro" (SM) is used generically herein to refer to a security technology that provides secure storage and execution of sensitive data and applications on UE devices, such as smart cards, mobile phones, Internet of Things (IoT) devices, and STBs. SM may provide a secure environment (e.g., Trusted Execution Environment (TEE)) that is isolated from the main operating system of the device, providing a secure platform for the execution of sensitive applications and the storage of confidential data. SM may use advanced security mechanisms, such as hardware-based isolation, secure boot, and encryption, to ensure the integrity, confidentiality, and authenticity of the data and applications stored and executed within the TEE. SM may be hard-coded during the manufacturing process so that it cannot subsequently be modified.

Digital content distribution systems, such as a digital TV broadcast network or a streaming service, may include a Conditional Access System (CAS) that is responsible for ensuring that only authorized users can access and consume digital content. The CAS may achieve this through the use of encryption and access control mechanisms, such as the Conditional Access Kernel (CAK) and Entitled hardware (e.g., SM/TEE). UE devices may determine time for a CAS through a process called time synchronization. Time synchronization ensures that the UE internal clock is accurate and synchronized with a clock used by the CAS server. Once the UE device's clock is synchronized with the CAS server, the CAS server may determine whether the user of the UE device is authorized to access the content/service at the current time. In instances in which the UE device is authorized, the UE device may decrypt the content/service data and display or implement the images/media/data. In instances in which the UE device is not authorized, the UE device may not decrypt the content/service data and display an error message.

Figure 1B:
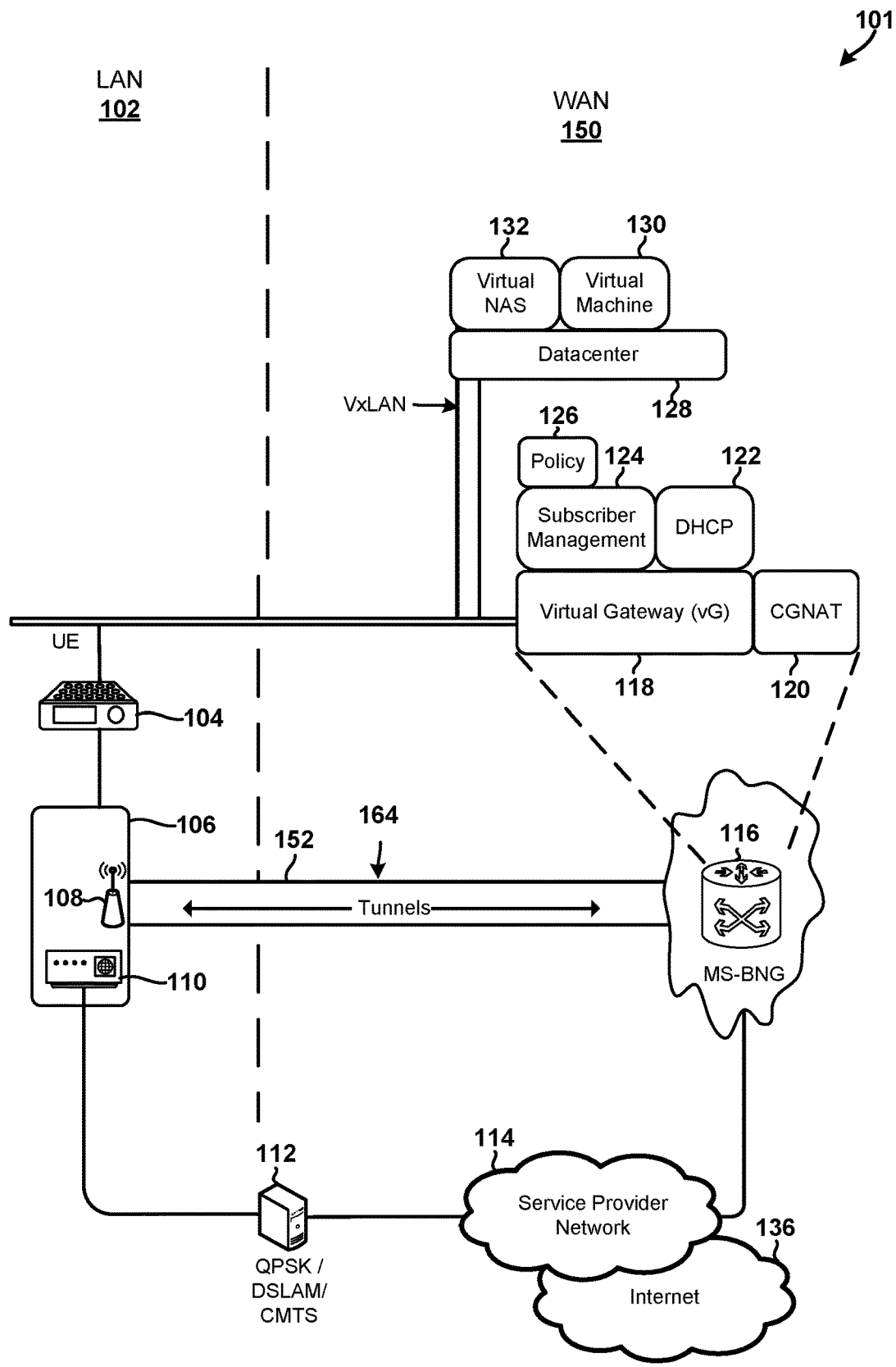

The various embodiments provide methods for determining and synchronizing the UE device clock with the CAS server clock used by any of a variety of digital content distribution systems. FIGS. 1A and 1B are simplified examples of digital content distribution systems 100, 101 that may be used to implement some embodiments. In the example illustrated in FIG. 1A, the network 100 includes a local area network (LAN) 102 and a wide area network (WAN) 150. The LAN 102 includes user equipment (UE) 104 devices (e.g., STB, mobile device, etc.) coupled to a customer premise equipment (CPE) 106 component/device via wired 103 and wireless 105 communication links. The CPE 106 includes communication links 107 to a service provider network 114 within the WAN 150 that allow the UE 104 devices to send and receive information to and from the Internet 136.

In the example, illustrated in FIG. 1B, the network includes a LAN 102, a UE 104 device, a CPE 106, a bridged residential gateway (BRG) 108, a cable modem (CM) 110, a quadrature phase shift keying (QPSK), digital subscriber line access multiplexer (DSLAM), or a cable modem termination system (CMTS) 112, a service provider network 114, an MS-BNG 116 component, a Virtual Gateway (vG) 118 component, a carrier-grade network address translation (CGNAT) 120 component, a DHCP 122 component, a subscriber management 124 component, a policy 126 component, a datacenter 128 component, a virtual machine 130 component, and a virtual network-attached storage (NAS) 132 component. Communications also may be facilitated via Out-of-Band (OOB) tunnels 152, a generic routing encapsulation (GRE) tunnel, local area network (LAN) links, Virtual Extensible LAN (VXLAN) links, and other wired or wireless communication links.

The OOB tunnels 164 may be secure communication channels used to transmit sensitive data between two or more endpoints. In computer networking, an out-of-band communication channel is a separate and dedicated channel that is used to transmit data that is unrelated to the primary data flow. OOB tunnels 164 may be set up over an existing network infrastructure, such as the internet or a private network, to provide a secure channel for transmitting sensitive data that needs to be protected from interception or tampering. OOB tunnels 164 tunnels may be established using various encryption and authentication protocols, such as internet protocol security (IPsec), secure sockets layer (SSL)/transport layer security (TLS), or secure shell (SSH). These protocols may ensure that the data transmitted over the OOB tunnel 164 is encrypted and authenticated, making it difficult for attackers to intercept or manipulate the data.

Quadrature phase shift keying (QPSK) is a type of digital modulation technique used to transmit digital signals over radio frequencies. It is commonly used in satellite communication systems and cable TV networks. The cable modem termination system (CMTS) may be a device used by cable service providers to provide high-speed internet access to their customers via cable networks. The CMTS may act as a bridge between the cable network and the internet, allowing data to be transmitted and received by CMs 110. Together, QPSK and CMTS may be used in cable TV networks to transmit digital signals, including internet data, to CMs 110 in households or businesses or LANs 102. For example, the QPSK/CMTS 112 component may be deployed in a headend or hubsite, and configured to facilitate high speed communications between the CM 110 and the components within the service provider network 114. QPSK may be used to modulate the digital signals, and the CMTS may be used to manage and control the transmission of data over the cable network.

A CPE device 106 may include a cable modem, digital subscriber line modem, router, switch, firewall, packet filter, wireless access point, and/or a residential gateway that provides network connectivity to home or small office network. In particular, a CPE device 106 may allow UE devices 104 on the LAN 102 to connect to WAN 150 and ultimately the Internet 136.

The CM 110 may be a network bridge that provides bi-directional data communication via radio frequency channels on a hybrid fiber-coaxial (HFC) and/or radio frequency over glass (RFOG) infrastructure. The service provider network 114 may include various network components for providing consumers with access to the Internet 136 or IP services over broadband connections.

In some embodiments, the network 101 may provide DHCP server functionally locally in the LAN 102 via the CPE 106. Alternatively, in some embodiments, the network 101 may include a DHCP 122 component in the WAN 150 and conventional CPE functions (e.g., DHCP, NAT, firewall, etc.) may be distributed between the BRG 108 in LAN 102 and the MS-BNG 116 or vG 118 in the WAN 150. Moving such functions from the LAN 102 onto the WAN 150 may allow the CPE 106 component to operate as a simple connectivity device that allows the UE 104 to connect to information and resources on the WAN 150. The MS-BNG 116 component may be configured to facilitate communications with the CPE 106 component via the GRE encapsulated tunnel 152. The MS-BNG 116 component and the CPE 106 component may create a logical subscriber link (LSL) between the BRG 108 component and the vG 118 component. The CGNAT 120 component may be configured to translate private-to-private IP addresses and private-to-public IP addresses. The DHCP 122 component may be an independent platform (with the MS-BNG 116 operating as a DHCP relay) or may be hosted by or within the MS-BNG 116. The DHCP 122 component may be configured to dynamically assign an IP address to each UE 104 device as part of a lease assignment.

The subscriber management 124 component may store subscriber information and/or perform various subscription management operations. The policy 126 component may be configured to determine and/or enforce various rules and policy decisions. The datacenter 128 component, virtual machine 130 component, and virtual NAS 132 component may provide a commodity hardware and a secure computing infrastructure for hosting the MS-BNG 116 or vG 118 components. These components may be used for hosting specialized services available to the customer as an extension of their home LAN 102.

It should be understood that the various embodiments may be implemented in any of a variety of different networks and digital content distribution systems, and the various embodiments should not be limited to the components or examples illustrated and described with reference to FIG. 1A or 1B unless expressly recited as such in the claims.

Figure 2:
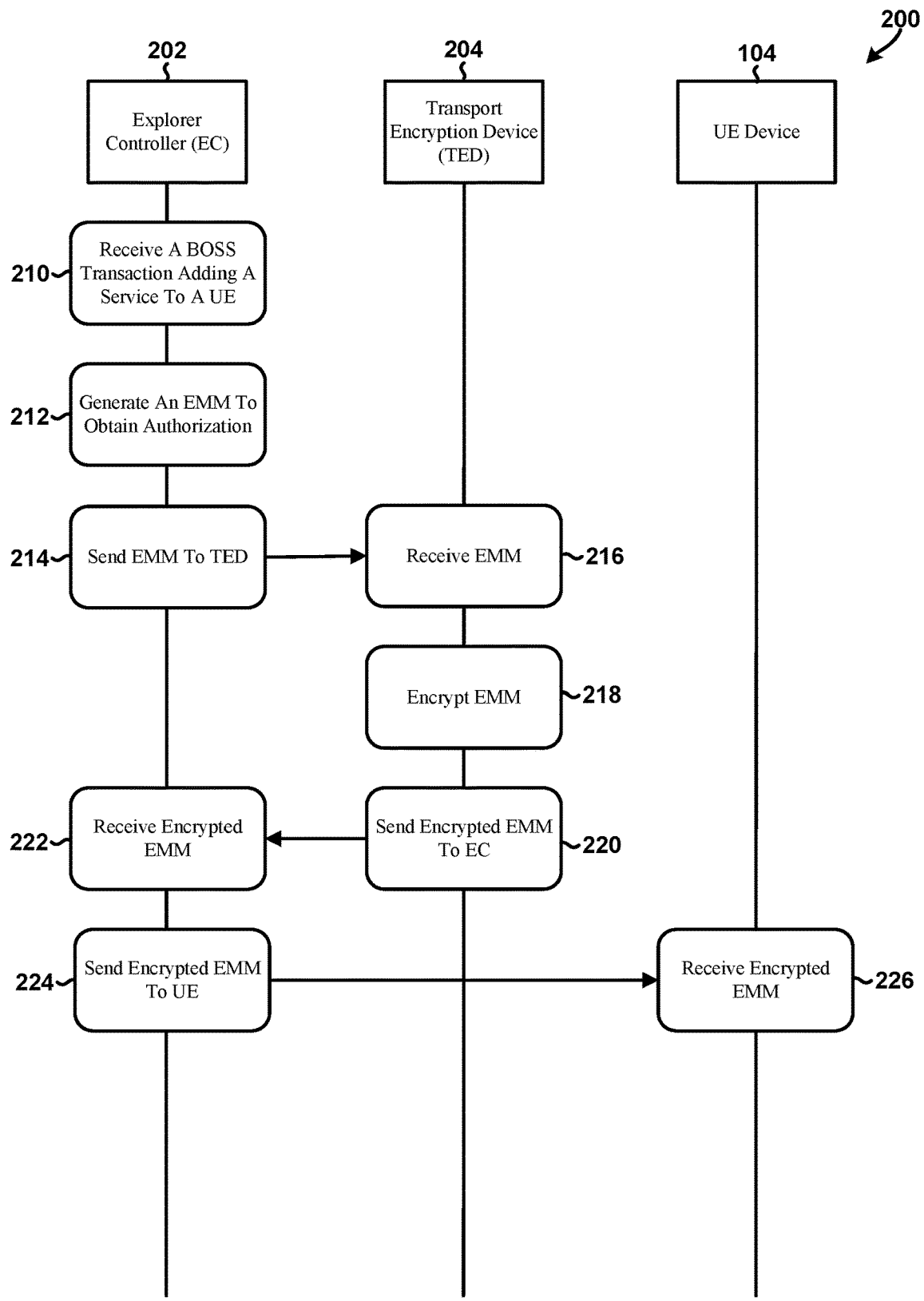
FIG. 2 is an activity diagram that illustrates the components, operations, and communications in a system configured to generate and send entitlement management messages (EMMs) in accordance with some embodiments.

FIG. 2 illustrates components, operations, and communications in a system 200 that could be configured to overcome hardware bit limitations for accurate timekeeping in accordance with some embodiments. In the example illustrated in FIG. 2, the system 200 includes an exemplary explorer controller (EC) 202 system, a transport encryption device 204, and a UE device 104. While the embodiment illustrated in FIG. is discussed in the context of cable and satellite service providers, the various embodiments are not intended to be limited to such context. Any service provider that manages entitlements for their customers to the service provider network/applications/services may implement the various disclosed embodiments.

The EC 202 may be a system that is used by cable and satellite providers to manage entitlements for their customers. In block 210, the EC 202 may receive a billing and ordering support system (BOSS) transaction adding a service to the UE device 104. A BOSS may be a type of transaction that is used to process billing and ordering information in a cable or satellite television system. In a BOSS transaction, customer information, such as their account number, package details, and payment information, may be collected and used to enable or disable access to specific channels or services, such as premium channels, rental movies, or pay-per-view events. BOSS transactions may also be used for ordering new services or modifications to existing services, such as adding a new channel package or upgrading to a higher tier of service. BOSS transactions may be processed in real-time, meaning that the customer's (end-user's) account may be updated immediately upon completion of the transaction.

In block 212, the EC 202 may generate an entitlement management message (EMM) to obtain authorization for adding a service to the customer's UE device 104. An EMM may be an information unit or message that includes information about what content or services the UE device 104 is authorized to access, as well as the dates/times for which the entitlement is valid. EMMs may include information such as the expiration date/time of the access rights, the type of content that a device is entitled to access, and the decryption keys for digital content. EMMs may ensure that the UE device 104 accesses only the content or services during the authorized time period.

In block 214, the EC 202 may send the EMM to the TED 204. The TED 204 may be a component used in cable and satellite television systems for encrypting and decrypting video signals and other transmitted data to ensure that only authorized subscribers can access the content. In some embodiments, the TED 202 may be installed at the headend of the network. In other embodiments, the TED 202 may be installed at other positions within the network. In a typical cable or satellite system, the TED 204 receives encrypted video signals from the content provider and decrypts them for authorized subscriber UEs 104.

In block 216, the TED 204 may receive the EMM from the EC 202. In block 218, the TED 204 may encrypt the EMM. For example, the TED 204 may use an encryption algorithm to convert the EMM into a format that may only be read by authorized devices. The encryption process may ensure that the EMM may not be intercepted or read by unauthorized parties/devices during transmission. In block 220, the TED 204 may send the encrypted EMM to the EC 202.

In block 222, the EC 202 may receive the encrypted EMM from the TED 204. In block 224, the EC 202 may send the encrypted EMM to the UE device 104. The EC 202 may use an OOB tunnel 164 or channel or other secure transmission methods to ensure that the EMM is only received by the intended UE device 104.

The UE device 104 may be an STB configured to enable or disable access to specific types of content or services based on the EMMs. The UE device 104 may include a private key that is used to decrypt broadcasts and switched digital video (SDV). In some embodiments, the UE device 104 may be configured to only use the private key to allow access to content when authorized by an EMM received from the EC 202.

Figure 3:
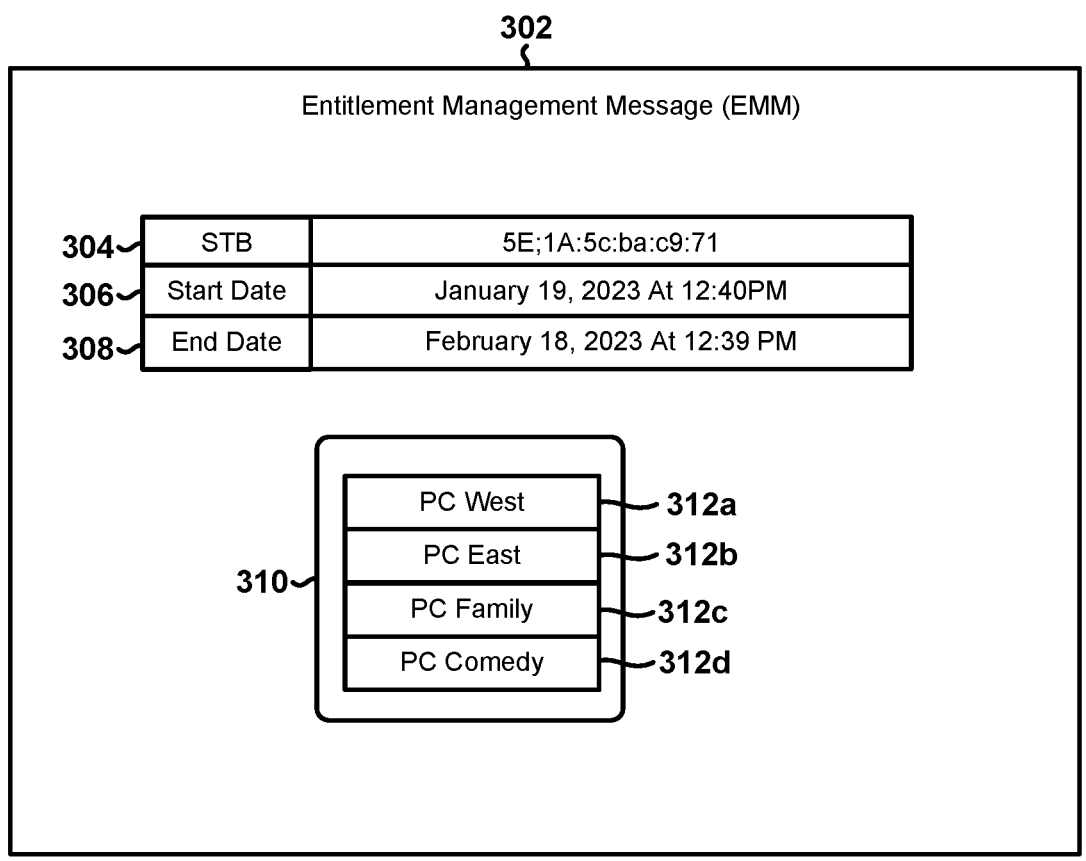
FIG. 3 is a block diagram illustrating information units in an example EMM suitable for use by the various embodiments.

FIG. 3 illustrates an example entitlement management message (EMM) 302 that could be generated and used in accordance with some embodiments. In the example illustrated in FIG. 3, the EMM 302 includes a UE/STB device identifier 304, a start date 306, an end date 308, and a package 310 that includes multiple segments 312a-312d.

In cable and satellite television systems, each channel that is offered to customers is considered a "source" in the EC 202. To control authorizations for these sources, each source is associated with a segment 312 which may be grouped into a package 310. Segments 312 and packages 310 both have start dates 306 and end dates 308, which may be used by the SM (TEE) in the UE device 104 to verify their authenticity. For example, a premium channel (PC) package could contain segments for PC West 312a, PC East 312b, PC Family 312c, PC Comedy 312d, and so on. In instances in which the package 310 is assigned to a UE device 104, the EC 202 may generate a unique EMM for that specific SM (TEE) of the UE device 104, encrypt the EMM, and send the encrypted EMM to the UE device 104 via out-of-band communications.

In instances in which a customer tunes to a channel or attempts to use a service, an entitlement check occurs within the SM (TEE) in the UE device 104 to verify that the UE device 104 is authorized to access the desired content or service. In some embodiments, the UE device 104 may have many EMMs stored in its SM (TEE) memory, including staging EMMs, packages, services, and potentially video-on-demand (VOD) orders and pay-per-view (PPV) orders. This may allow the UE device 104 to check its entitlements quickly and efficiently when a end user wants to access content or services.

Figure 4:
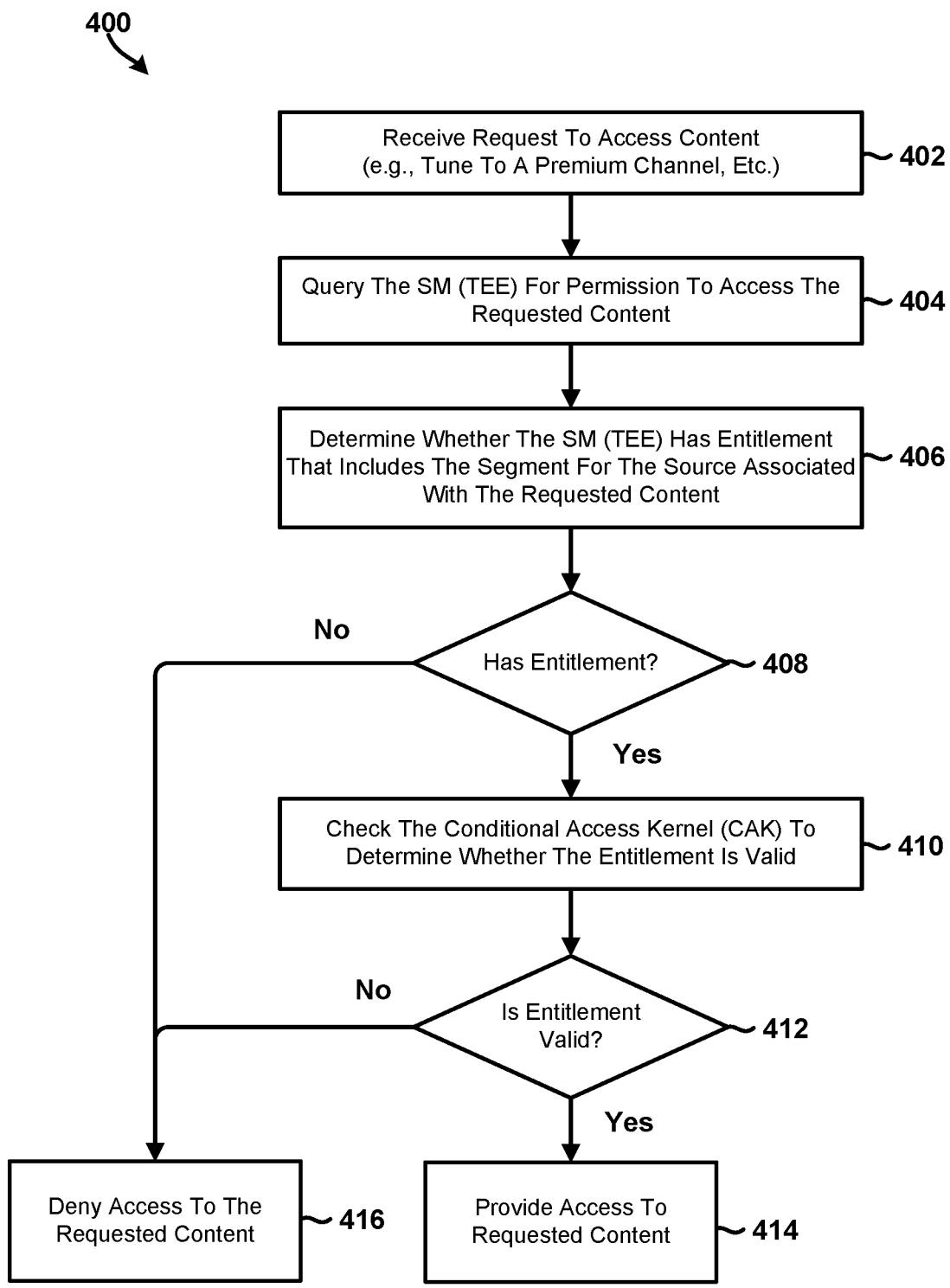
FIG. 4 is a process flow diagram illustrating a method of providing access to content in accordance with some embodiments.

FIG. 4 illustrates a method 400 of providing access to content in accordance with some embodiments. Method 400 may be performed by a processor in a UE device 104, such as by a 24-bit processor in an STB. In some embodiments, the processor may perform the operations by operating an STB host, which may be the main processing unit within the STB that is responsible for handling various functions such as decoding the received signal, decrypting the encrypted content, and displaying it on the screen. The STB host may communicate with other components of the system, such as the Conditional Access System (CAS) and the Entitled hardware, to ensure that only authorized content is displayed to the user.

In block 402, the processor (STB host) may receive a request to access content (e.g., customer requests to tune to a premium channel, etc.). In block 404, the processor (STB host) may query the SM (TEE) for permission to access the requested content. Entitled hardware, such as the SM/TEE in the UE device 104, may act as a physical barrier between the digital content and unauthorized users, ensuring that only authorized devices access the content. The entitled hardware may include a unique identifier, such as a device ID or entitlement ID. The entitled hardware may send a time and device ID (or entitlement ID, etc.) to the conditional access system (CAS) to allow the CAS to verify that the device attempting to access the digital content is authorized to do so. The CAS may use the device ID to ensure that the device attempting to access the content is one of the devices authorized to do so. The CAS may use the time value to ensure that the user's access rights are still valid at the time of the attempted access.

Referring again to FIG. 4, in blocks 406 and 408, the processor may determine whether the SM/TEE has an entitlement that includes the segment (e.g., segments 312a-312d, etc.) for the source (e.g., channel offered to customers) associated with the requested content. In response to determining that the SM/TEE has the entitlement (i.e., determination block 408="Yes"), the processor may check the conditional access kernel (CAK) of the CAS to determine whether the entitlement is valid in blocks 410 and 412. The CAK may be a software-based access control mechanism that ensures that only authorized users with the appropriate access rights access content. The CAK may maintain a database of authorized users and their access rights, which may be based on various factors such as time. For example, a user may have access to a particular channel until a specific date/time. When a user attempts to access digital content, the entitled hardware (e.g., SM/TEE) may send a date and/or time and device ID to the CAS, which may check its database of authorized users to verify that the device is authorized to access the content. In instances in which the UE device is authorized, the CAK may provide decryption keys to the entitled hardware, which may then decrypt the content and provide it to the user.

In response to determining that the entitlement is valid (i.e., determination block 412="Yes"), the processor may provide access to the requested content in block 414. Alternatively, in response to determining that the SM/TEE does not have the entitlement (i.e., determination block 408="No") or in response to determining that the entitlement is not valid (i.e., determination block 412="No"), the processor may deny access to the requested content (and display an error message, etc.) in block 416. For example, the processor may cause the UE device to display the message "You are not authorized for this program, please call your cable provider to add the service."

A common hardware limitation in computing devices such as UE devices 104 (e.g., STBs, etc.) may prevent the devices from understanding dates/time beyond a Bit Limitation Date. After the Bit Limitation Date, the CAK and SM may no longer be able to evaluate the start and end times for the EMM expiration.

For example, a popular and widely deployed and still in service STB was designed as a 24-bit machine with an epoch start date of Jan. 1, 1993. The 24-bit design means that the device may understand up to 224 numbers (or 16,777,216). As such, the range of signed integers that may be represented in 24 bits is −8,388,608 to 8,388,607 and the range of unsigned integers that can be represented in 24 bits is 0 to 16,777,215. According, a 24-bit machine may count up to a maximum of 16,777,215 minutes, which is 279,620.25 hours, or about 11,650 days. This means that a 24-bit device that includes an epoch start date of Jan. 1, 1993 has a Bit Limitation Date of Nov. 24, 2024—or roughly 11,650 days after its epoch start date. After the Bit Limitation Date, the time counter on the UE device may reset to the epoch start date (e.g., Jan. 1, 1993, etc.). Further, other computing devices, such as the EC 202 that calculates the conditional access time (CA_Time), may include a different epoch start date (e.g., Jan. 1, 1970), and thus the CA_time may be computed differently than the time values computed by the operating system time counters.

For these and other reasons, the CAK and/or SM/TEE may no longer be able to correctly evaluate the start and end times for the EMMs after the Bit Limitation Date, which could lead to a denial of services or potential failure of the STBs.

The various embodiments overcome these and other bit limitations of UE devices and other computing systems by altering the way in which the UE device 104 counts or evaluates time. The embodiments may allow the EC 202 and CAS to continue functioning and the UE devices 104 to continue enforcing content and feature controls after the Bit Limitation Date.

In some embodiments, a 24-bit UE device may be configured to determine the current time by:

$x$ = expiry threshold epoch_start = Jan. 1, 1993 counter = 0 if (CA_Time >= 2^24) {counter ++;} current_time = epoch_start + counter (2^24) + CA_time;

That is, the UE device may initialize a counter with a value of zero, and determine whether the CA_Time value received from the EC 202 is greater than or equal to a expiry threshold or a bit limitation (e.g., $2^{24}$). Said another way, the UE device may determine whether a received time value (e.g., included in an EMM, etc.) exceeds a Bit Limitation Date of the device (e.g., beyond 224 minutes in 24-bit machines, etc.). If so, the UE device may increment the counter by one. The UE device may then determine the current_time by adding the epoch_start (e.g., Jan. 1, 1993 in the example above) to the CA_Time to the product of the counter and the bit limitation (e.g., $2^{24}$). The counter may be kept in memory, while the bits reserved for the date are left untouched. This would be applicable to any machine limitation by replacing $2^{24}$ with the bit limitation of that machine.

In some embodiments, the machine that issues the entitlement (e.g., EC 202) may be configured to determine the CA_time by:

counter = 0;

if (CA_Time >= 2^24) {counter ++;}

CA_time = current_time − counter (2^24) − epoch_start;

For example, the EC 202 may initialize a counter with a value of zero, and determine whether the CA_Time value received from the EC 202 is greater than or equal to a bit limitation (e.g., $2^{24}$) of the UE device. If so, the EC 202 may increment the counter by one. The EC 20 may determine CA_time by subtracting from the current_time the epoch_start (e.g., Jan. 1, 1993 in the example above) minus the product of the counter and the bit limitation (e.g., $2^{24}$). Thus, in the above example, rather sending the value of the CA_time as Dec. 17, 2025-Jan. 1, 1993 which would return a value greater than $2^{24}$, the CA_time would be sent as Dec. 17, 2025-Nov. 24, 2024, effectively shifting the start of the epoch and matching what will be contained within the CAK.

By utilizing these calculations, the system ensures that the CA_time remains within the bit limitation (e.g., $2^{24}$ for 24-bit machines) and accurately calculates the current time. Updating both the conditional access system and the UE device allows the system to maintain synchronization between the EC 202 and UE 104 and may help ensure uninterrupted services for both the customer and provider. These updates may be performed behind the scenes through server-side application updates and client-side firmware updates, without any customer impact.

In addition, the use of a counter may allow for more efficient storage of the current time, reducing the amount of memory required to store the value. The accurate tracking of time may support the proper functioning of the CAS, particularly in the management of access rights and permissions for digital content.

Figure 5:
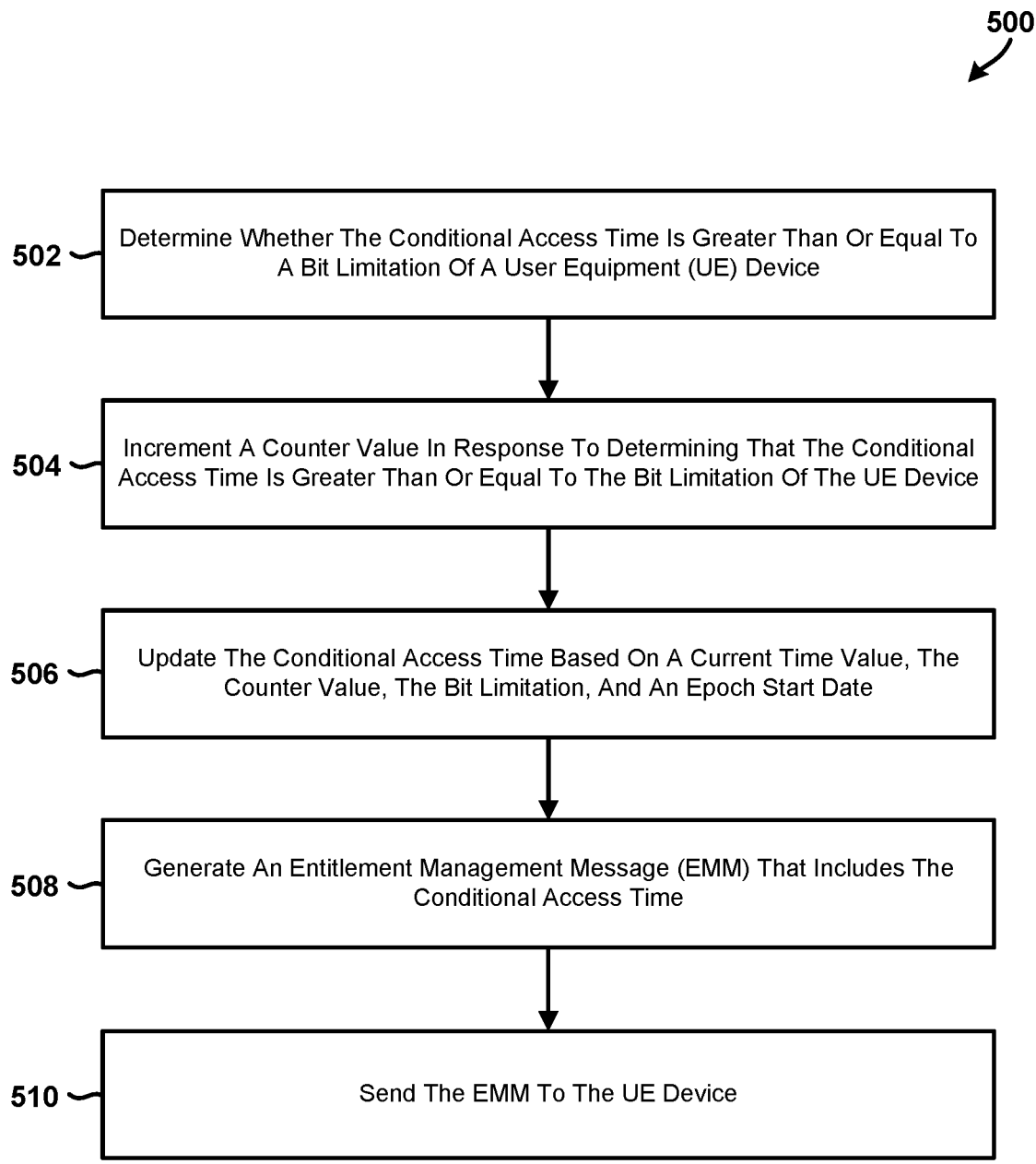
FIG. 5 is a process flow diagram illustrating a method of determining conditional access time in accordance with some embodiments.

FIG. 5 illustrates a method 500 of determining conditional access time in a computing device in accordance with some embodiments. Method 500 may be performed by a processor in a computing device (e.g., server computing device that implements EC 202, etc.).

In block 502, the processor may determine whether a conditional access time (CA_Time) is greater than or equal to a bit limitation of a user equipment (UE) device. As discussed above, the bit limitation (e.g., 224, etc.) may be a common hardware limitation of computing devices that could prevent them from understanding dates beyond a Bit Limitation Date. The conditional access time may specify the time window during which a user is authorized to access certain content. The conditional access time may be included in an EMM that includes information about what content is being enabled, for which Set-Top Box (STB), and for what period of time the entitlement is valid. The STB may use this information to determine whether a user is authorized to access the content and for how long.

In block 504, the processor may increment a counter value in response to determining that the conditional access time is greater than or equal to the bit limitation of the UE device. The processor may store the counter in memory.

In block 506, the processor may update the conditional access time based on a current time value, the counter value, the bit limitation, and an epoch start date. For example, the processor may determine a product of the counter value and bit limitation, and set the conditional access time equal to the current time value minus the epoch start date minus the product of the counter value and bit limitation. As a further example, the processor may set the conditional access time (CA_Time) equal to current_time−counter($2^{24}$)−epoch_start in block 506.

In block 508, the processor may generate an entitlement management message (EMM) that includes the conditional access time. As discussed above, the EMM may include information about what content is being enabled, for which UE or STB device, and for what period of time the entitlement is valid. In block 510, the processor may send the EMM to the UE device.

Figure 6:
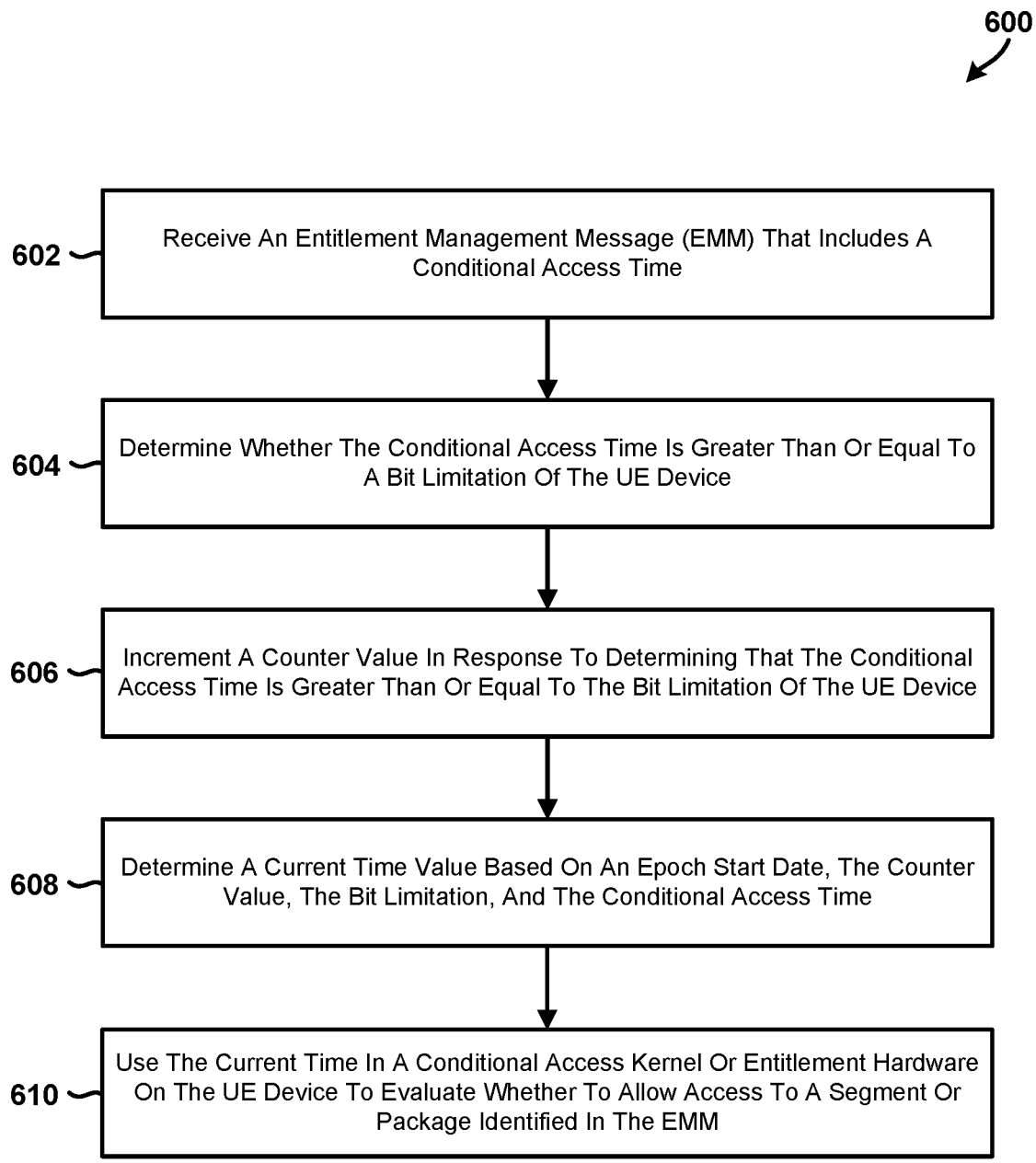
FIG. 6 is a process flow diagram illustrating a method of determining time in accordance with some embodiments.

FIG. 6 illustrates a method 600 of time in a computing device in accordance with some embodiments. Method 600 may be performed by a processor in a computing device (e.g., UE device 104, etc.).

In block 602, the processor may receive an entitlement management message (EMM) that includes a conditional access time.

In block 604, the processor may determine whether the conditional access time is greater than or equal to a bit limitation of the UE device.

In block 606, the processor may increment a counter value in response to determining that the conditional access time is greater than or equal to the bit limitation of the UE device. The processor may store the counter in memory.

In block 608, the processor may determine a current time value based on an epoch start date, the counter value, the bit limitation, and the conditional access time.

In block 610, the processor may use the current time in a Conditional Access Kernel or entitlement hardware on the UE device to evaluate whether to allow access to a segment or package identified in the EMM.

Some embodiments may include a method of updating a UE device (e.g., set top box, etc.) that includes a bit limitation and entitlement hardware. The UE device may be configured to receive an entitlement management message from a server via a secure connection and use the entitlement management message to enable or restrict features on the UE device. In some embodiments, the UE device may be configured to determine whether the entitlement management message includes an expiration time that is beyond a limit (e.g., beyond $2^{24}$ minutes in 24-bit machines, etc.) past an epoch start date-time. If so, the UE device may calculate a new time by adding the limit (e.g., $2^{24}$) to the expiration time of the entitlement management message. In some embodiments, the method may include sending the new calculated time with the entitlement management message.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 400, 500, 600 may be substituted for or combined with one or more operations of the methods 400, 500, 600, and vice versa.

Figure 7:
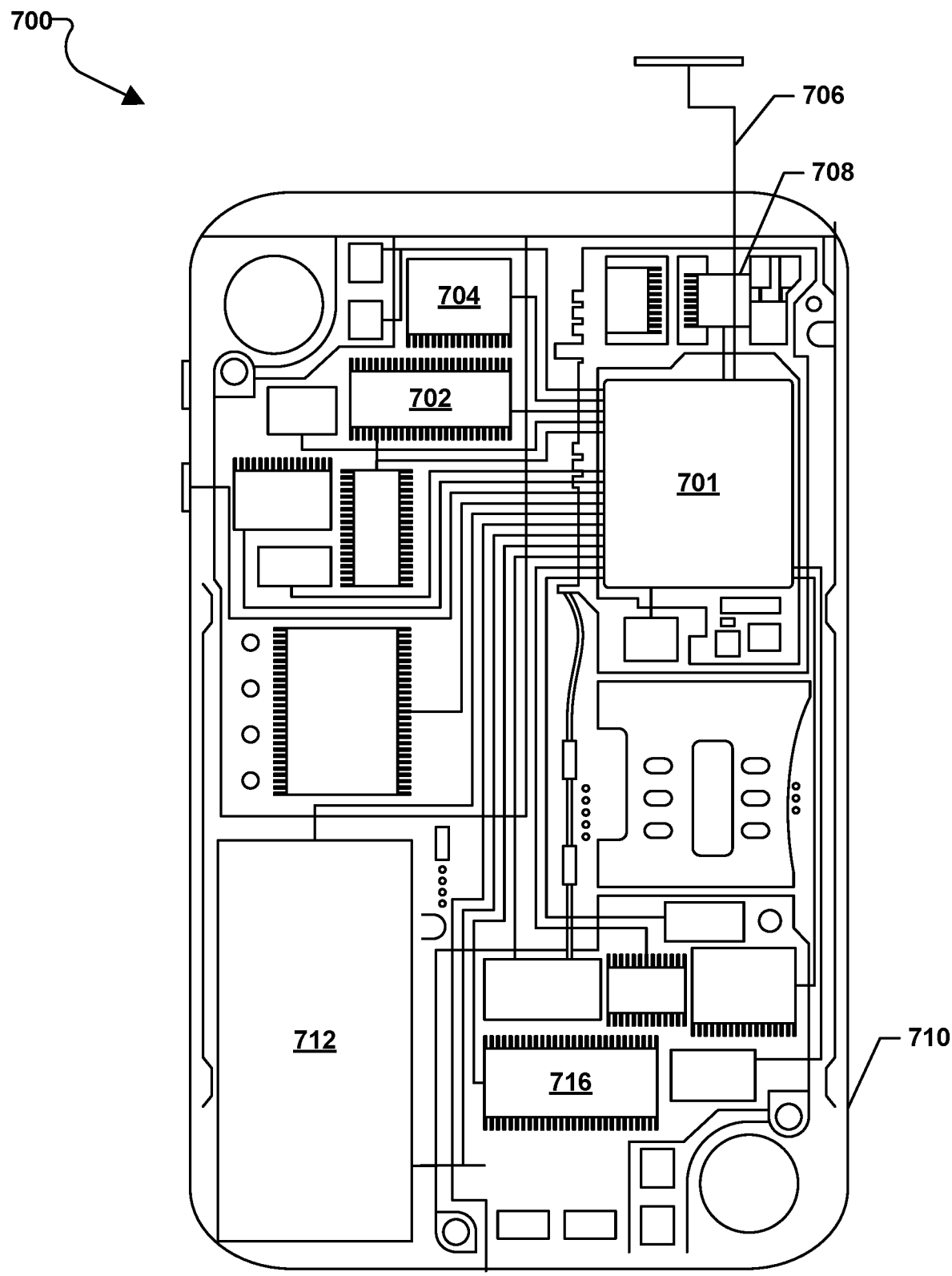
FIG. 7 is a component block diagram of a user equipment (UE) device suitable for implementing some of the embodiments.

Some embodiments (including, but not limited to, embodiments discussed above with reference to FIGS. 1-6) may be implemented in any of a variety of UE computing devices (e.g., UE device 104, etc.), an example of which is illustrated in FIG. 7. For example, the computing device 700 may include a processor 701 coupled to a controller 704 and an internal memory 702. The processor 701 may be one or more multicore integrated circuits (ICs) designated for general or specific processing tasks. The internal memory 702 may be volatile or non-volatile memory, and may also be secure and/or encrypted memory, or unsecure and/or unencrypted memory, or any combination thereof.

With reference to FIG. 7, the UE computing device 700 may have one or more radio signal transceivers 708 (e.g., Peanut®, Bluetooth®, ZigBee®, Wi-Fi, cellular, etc.) and antennae 706, for sending and receiving, coupled to each other and/or to the processor 701. The transceivers 708 and antennae 706 may be used with the above-mentioned circuitry to implement the various wireless transmission protocol stacks and interfaces. In some embodiments, a UE computing device 700 may include a cellular network wireless modem chip 716 that enables communication via a cellular network and is coupled to the processor.

The UE computing device 700 may also include a housing 710, constructed of a plastic, metal, or a combination of materials, for containing all or some of the components discussed herein. The computing device 700 may include a power source 712 coupled to the processor 701, such as a disposable or rechargeable battery. The rechargeable battery may also be coupled to the peripheral device connection port to receive a charging current from a source external to the computing device 700.

Figure 8:
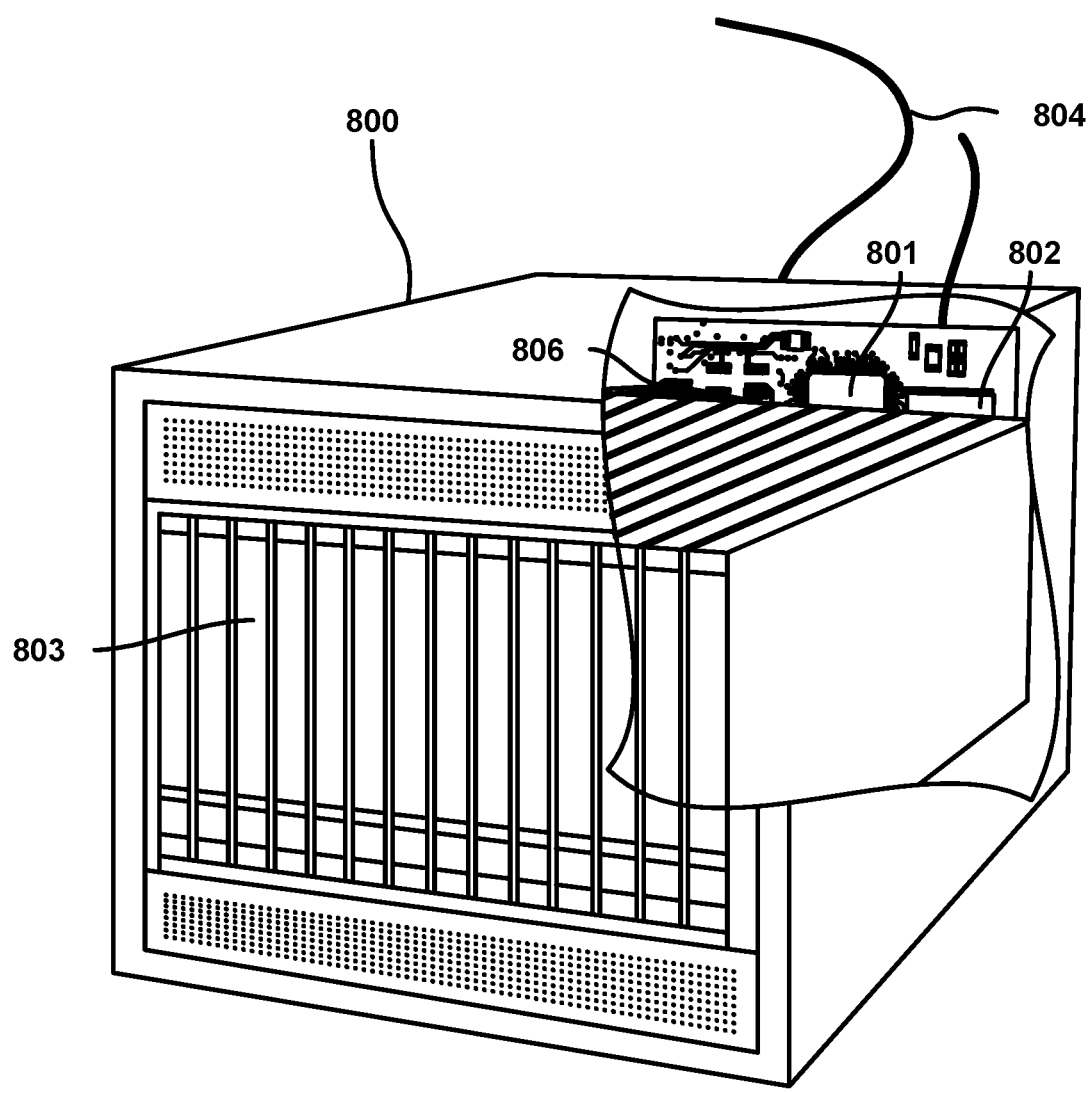
FIG. 8 is a component diagram of an example server suitable for implementing some embodiments.

Some embodiments (e.g., EC 202, etc.) may be implemented on any of a variety of commercially available computing devices, such as the server computing device 800 illustrated in FIG. 8. Such a server device 800 may include a processor 801 coupled to volatile memory 802 and a large capacity nonvolatile memory, such as a disk drive 803. The server device 800 may also include a floppy disc drive, USB, compact disc (CD) or DVD disc drive coupled to the processor 801. The server device 800 may also include network access ports 806 coupled to the processor 801 for establishing data connections with a network connection circuit 804 and a communication network (e.g., IP network) coupled to other communication system network elements.

Referring now to FIGS. 1A-6, a method for determining time in a user equipment (UE) device, may include the operations of: receiving an entitlement management message (EMM) that includes a conditional access time; determining whether the conditional access time is greater than or equal to a bit limitation of the UE device; incrementing a counter value in response to determining that the conditional access time is greater than or equal to the bit limitation of the UE device; and determining a current time value based on an epoch start date, the counter value, the bit limitation, and the conditional access time.

In one embodiment, determining the current time value based on the epoch start date, the counter value, the bit limitation, and the conditional access time may include: determining a product of the counter value and bit limitation; and setting the current time value equal to the sum of the epoch start date, the conditional access time, and the product of the counter value and bit limitation. In one embodiment, the bit limitation may be $2^{23}$, $2^{24}$, or $((2^{24})-1)$. In one embodiment, the epoch start date may be Jan. 1, 1993. In one embodiment, the method may further include the operation of using the current time in a Conditional Access Kernel or entitlement hardware on the UE device to evaluate whether to allow access to a segment or package identified in the EMM.

Referring again to FIGS. 1A-6, a method of determining a conditional access time in a sever device is provided and may include the operations of: determining whether the conditional access time is greater than or equal to a bit limitation of a user equipment (UE) device; incrementing a counter value in response to determining that the conditional access time is greater than or equal to the bit limitation of the UE device; and updating the conditional access time based on a current time value, the counter value, the bit limitation, and an epoch start date.

In one embodiment, updating the conditional access time based on the current time, the counter value, the bit limitation, and the epoch start date may include: determining a product of the counter value and bit limitation; and setting the conditional access time equal to the current time value minus the epoch start date minus the product of the counter value and bit limitation. In one embodiment, the method may also include: generating an entitlement management message (EMM) that includes the conditional access time; and sending the EMM to the UE device.

The processors discussed in this application may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors themselves. Additionally, as used herein, any reference to a memory may be a reference to a memory storage and the terms may be used interchangeable.

Implementation examples are described in the following paragraphs. While some of the following implementation examples are described in terms of example methods, further example implementations may include: the example methods discussed in the following paragraphs implemented by a computing device including a processor configured with processor-executable instructions to perform operations of the methods of the following implementation examples; the example methods discussed in the following paragraphs implemented by a computing device including means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

Example 1: A method of determining time in a user equipment (UE) device, including receiving an entitlement management message (EMM) that includes a conditional access time, determining whether the conditional access time is greater than or equal to a bit limitation of the UE device, incrementing a counter value in response to determining that the conditional access time is greater than or equal to the bit limitation of the UE device, and determining a current time value based on an epoch start date, the counter value, the bit limitation, and the conditional access time.

Example 2: The method of example 1, in which determining the current time value based on the epoch start date, the counter value, the bit limitation, and the conditional access time includes determining a product of the counter value and bit limitation, and setting the current time value equal to the sum of the epoch start date, the conditional access time, and the product of the counter value and bit limitation.

Example 3: The method of any of the examples 1 and 2, in which the bit limitation is $2^{23}$ or $2^{24}$.

Example 4: The method of any of the examples 1-3, in which the epoch start date is Jan. 1, 1993.

Example 5: The method of any of the examples 1-4, further including using the current time in a Conditional Access Kernel or entitlement hardware on the UE device to evaluate whether to allow access to a segment or package identified in the EMM.

Example 6: A method of determining a conditional access time in a server device, including determining whether the conditional access time is greater than or equal to a bit limitation of a user equipment (UE) device, incrementing a counter value in response to determining that the conditional access time is greater than or equal to the bit limitation of the UE device, and updating the conditional access time based on a current time value, the counter value, the bit limitation, and an epoch start date.

Example 7: The method of example 6, in which updating the conditional access time based on the current time, the counter value, the bit limitation, and the epoch start date includes determining a product of the counter value and bit limitation, and setting the conditional access time equal to the current time value minus the epoch start date minus the product of the counter value and bit limitation.

Example 8: The method of any of the examples 1 and 2, further including generating an entitlement management message (EMM) that includes the conditional access time, and sending the EMM to the UE device.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, components, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of determining a current time value in a user equipment (UE) device, comprising:
   receiving an entitlement management message (EMM) that includes a conditional access time;
   determining whether the conditional access time is greater than or equal to a bit limitation of the UE device;
   incrementing a counter value in response to determining that the conditional access time is greater than or equal to the bit limitation of the UE device; and
   determining the current time value based on an epoch start date, the counter value, the bit limitation, and the conditional access time.

2. The method of claim 1, wherein determining the current time value based on the epoch start date, the counter value, the bit limitation, and the conditional access time comprises:
   determining a product of the counter value and the bit limitation; and setting the current time value equal to a sum of the epoch start date, the conditional access time, and the product of the counter value and the bit limitation.

3. The method of claim 1, wherein the bit limitation is 2^23 or 2^24.

4. The method of claim 1, wherein the epoch start date is Jan. 1, 1993.

5. The method of claim 1, further comprising using the current time in a Conditional Access Kernel or entitlement hardware on the UE device to evaluate whether to allow access to a segment or package identified in the EMM.

6. A user equipment (UE) device, comprising:
a processor configured to:
receive an entitlement management message (EMM) that includes a conditional access time;
determine whether the conditional access time is greater than or equal to a bit limitation of the UE device;
increment a counter value in response to determining that the conditional access time is greater than or equal to the bit limitation of the UE device; and
determine a current time value based on an epoch start date, the counter value, the bit limitation, and the conditional access time.

7. The UE device of claim 6, wherein the processor is configured to determine the current time value based on the epoch start date, the counter value, the bit limitation, and the conditional access time by:
determining a product of the counter value and the bit limitation; and
setting the current time value equal to the sum of the epoch start date, the conditional access time, and the product of the counter value and the bit limitation.

8. The UE device of claim 6, wherein the processor is configured such that the bit limitation is $2^{23}$ or $2^{24}$.

9. The UE device of claim 6, wherein the processor is configured such the epoch start date is Jan. 1, 1993.

10. The UE device of claim 6, wherein the processor is further configured to use the current time in a Conditional Access Kernel or entitlement hardware on the UE device to evaluate whether to allow access to a segment or package identified in the EMM.

11. A non-transitory computer readable storage medium having stored thereon processor-executable software instructions configured to cause a processor to perform operations for determining a current time value in a user equipment (UE) device, the operations comprising:
receiving an entitlement management message (EMM) that includes a conditional access time;
determining whether the conditional access time is greater than or equal to a bit limitation of the UE device;
incrementing a counter value in response to determining that the conditional access time is greater than or equal to the bit limitation of the UE device; and
determining the current time value based on an epoch start date, the counter value, the bit limitation, and the conditional access time.

12. The non-transitory computer readable storage medium of claim 11, wherein the stored processor-executable software instructions are configured to cause a processor to perform operations such that determining the current time value based on the epoch start date, the counter value, the bit limitation, and the conditional access time comprises:
determining a product of the counter value and the bit limitation; and
setting the current time value equal to the sum of the epoch start date, the conditional access time, and the product of the counter value and the bit limitation.

13. The non-transitory computer readable storage medium of claim 11, wherein the bit limitation is $2^{23}$ or $2^{24}$.

14. The non-transitory computer readable storage medium of claim 11, wherein the stored processor-executable software instructions are configured to cause a processor to perform operations such that the epoch start date is Jan. 1, 1993.

15. The non-transitory computer readable storage medium of claim 11, wherein the stored processor-executable software instructions are configured to cause a processor to perform operations further comprising using the current time in a Conditional Access Kernel or entitlement hardware on the UE device to evaluate whether to allow access to a segment or package identified in the EMM.

* * * * *